April 16, 1963
S. F. BUSHMAN ET AL
3,085,486
PHOTOGRAPHIC CAMERA HAVING AN AUTOMATIC
EXPOSURE CONTROL DEVICE
Filed March 2, 1959
2 Sheets-Sheet 1
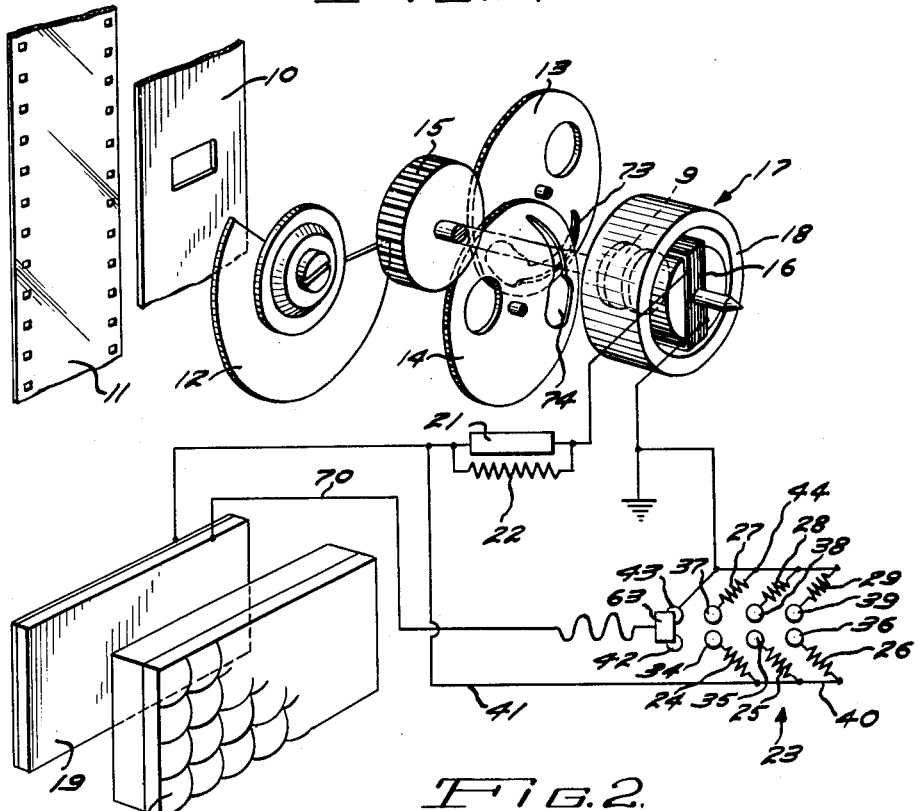
Fig.1.
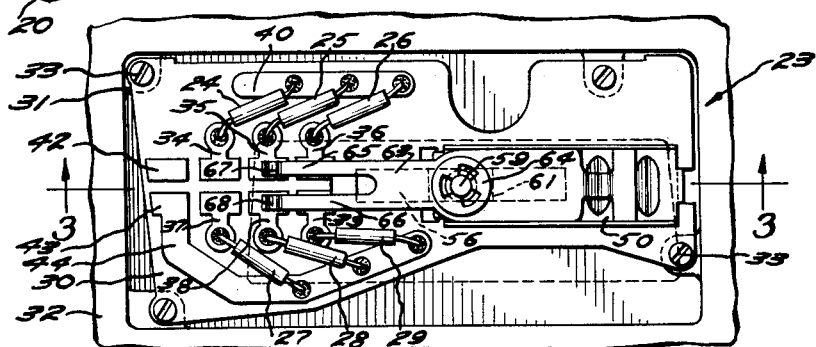
Fig.2.
Fig.3.
*Inventors:*
Stephen F. Bushman
Vello Suigussaar
By Robert F. Michton Atty.

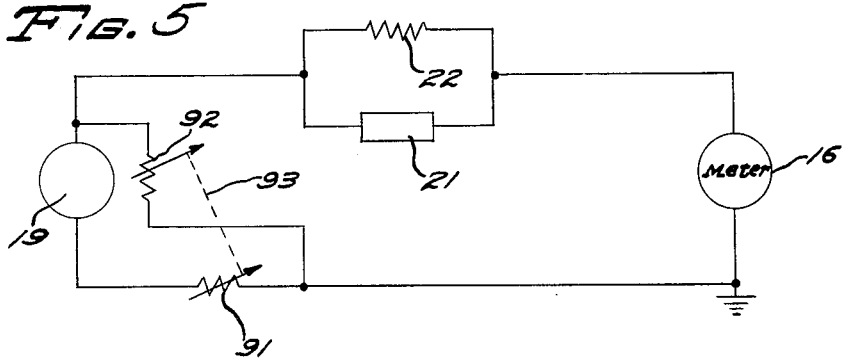
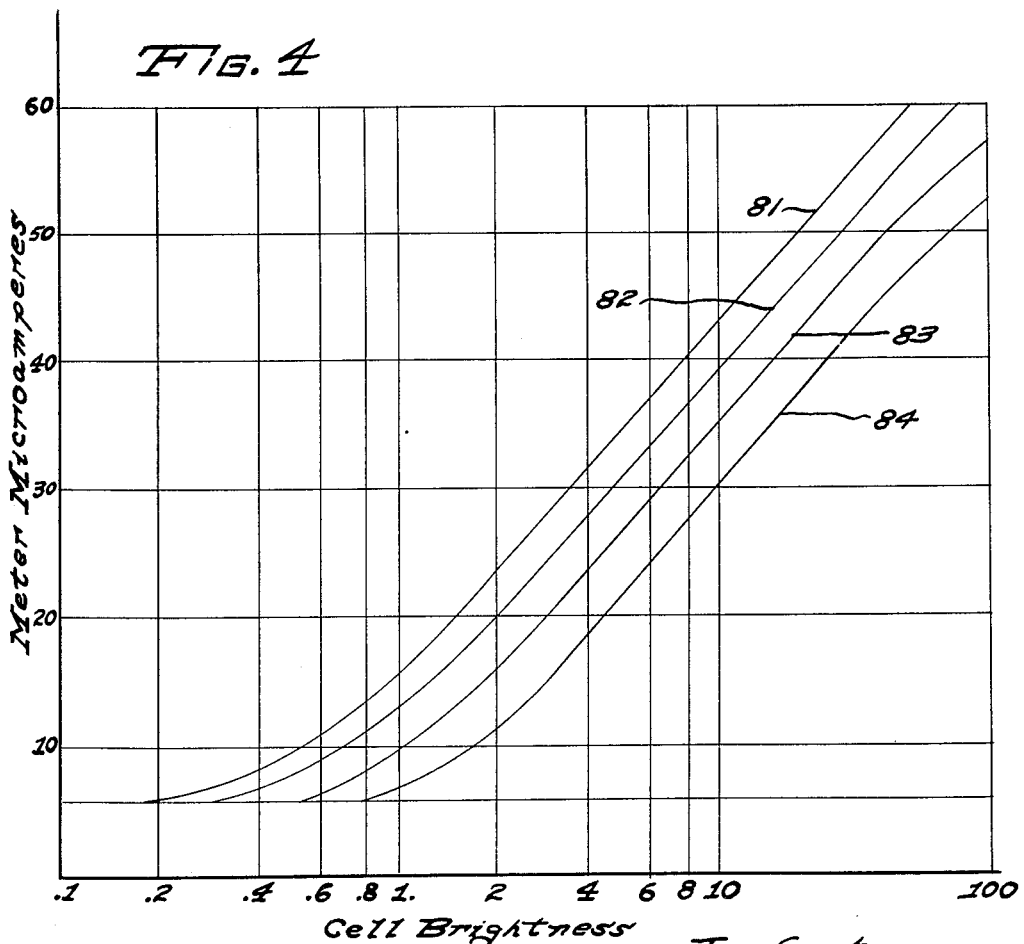

United States Patent Office 3,085,486
Patented Apr. 16, 1963

3,085,486
PHOTOGRAPHIC CAMERA HAVING AN AUTO-
MATIC EXPOSURE CONTROL DEVICE
Stephen F. Bushman, Des Plaines, and Vello Suigussaar, Chicago, Ill., assignors to Bell & Howell Company, Chicago, Ill., a corporation of Illinois
Filed Mar. 2, 1959, Ser. No. 796,562
5 Claims. (Cl. 95—64)

This invention relates to a photographic camera having an automatic exposure control device, and more particularly to an automatic exposure control device adjustable for a plurality of film or shutter speeds.

An object of the invention is to provide simple, effective means for adjusting an automatic exposure control means for different film speeds and/or different shutter speeds.

Another object of the invention is to provide an automatic exposure control device having an adjustable resistance to vary the operating range of a galvanometer of the device.

Yet another object of the invention is to provide an automatic exposure control device having a galvanometer acting as a prime mover and a photoelectric cell driving the galvanometer together with a series of stepped resistors in shunt with the galvanometer and a series of stepped resistors in series with the shunt resistors and the galvanometer, the shunt resistors and the series resistors being connected into the circuit in steps varying the effective shunt resistance and the effective series resistance thereof generally inversely relative to one another.

In the drawings:

FIG. 1 is a perspective, schematic view of an exposure control device forming one embodiment of the invention;

FIG. 2 is an enlarged, fragmentary top plan view of a resistance box forming a part of the exposure control device of FIG. 1;

FIG. 3 is a vertical section taken along line 3—3 of FIG. 2;

FIG. 4 is a view showing a chart illustrating characteristics of the device of FIG. 1; and FIG. 5 is a schematic view of an electrical circuit of an automatic exposure control device forming an alternate embodiment of the invention.

The invention provides a camera having an automatic exposure control device which includes adjustable exposure control means together with a galvanometer to drive the exposure control means and a photoelectric cell for energizing the galvanometer. Adjustable resistance means is connected in circuit with the galvanometer and photoelectric cell to change the energization of the galvanometer by the cell for a given illumination of the cell, and, in one embodiment of the invention the adjustable resistance means includes an adjustable shunt resistance connected in shunt with the galvanometer and an adjustable series resistance connected in series with the shunt resistance and the galvanometer, with the shunt and series resistances adjustable inversely relative to one another. The resistance means may be in the form of inversely adjustable potentiometers or may be a stepped resistance box including a printed circuit which has a series of pairs of contacts. In the resistance box, a plurality of shunt resistors of different resistances connected at one end to a common bus on the board of the circuit and at the other ends to one contact of each pair, and a plurality of series resistors of different resistances are similarly connected at one end to a common bus on the board and at the other ends thereof to the other contacts of each pair. The box also may include a spring contactor having one end engaging a detent contact and the other end designed to successively engage the pairs of stops to bridge them and connect them to the detent contact as the contactor is slid along the printed circuit.

Referring now to FIG. 1 of the drawings, a photographic motion picture camera shown schematically therein includes an aperature plate 10 in front of a film 11 transported by known means (not shown) which may be manually adjusted, if desired, between different speeds, such as for example, between sixteen frames per second and forty-eight frames per second. In front of the aperture plate is a known shutter 12 driven in synchronization with the film transport means and a pair of diaphragm discs 13 and 14 in front of the shutter are adjusted by a gear 15 driven by a coil or armature 16 of a galvanometer 17 to control the cross-sectional area or aperture of the path of light from a lens or optical objective 9 permitted to travel to the film. Preferably the construction and operation of the diaphragm discs 13 and 14 and gear 15 are identical with those disclosed and claimed in Bagby et al. Patents 2,841,064 and 2,858,754. The construction of the galvanometer 17 also is disclosed in these patents. The galvanometer also includes a stator 18.

The galvanometer coil 16 is driven against a spring (not shown) by a photoelectric cell 19 of known construction having a reticulated lens 20 in front of the cell, and the cell 19 is positioned to receive light through the lens from the exterior of the camera in an intensity proportional to the illumination of the scene to be photographed. One side of the cell is connected to the coil 16 through a temperature-compensating network comprising a thermistor 21 and a resistor 22 connected in parallel with one another. The other side of the coil is grounded, and the other side of the cell is connected to ground through a manually adjustable resistance box 23.

The photoelectric cell 19 is of the barrier layer type and is photovoltaic. As such, the cell may be considered to be a current generator having an internal shunt resistance which decreases with increase of illumination of the cell. During high illumination of the cell, the internal resistance of the cell is not greater than a few percent of the internal resistance of the cell during low illumination of the cell. When the resistance box 23 is set manually in its adjustment in which the series and shunt resistors of the resistance box are omitted from the circuit, the current through the coil 16 follows curve 81 (FIG. 4) with changes in illumination of the cell 19, and this adjustment is designed to be used with the fastest film speed (or the fastest shutter speed). However, for use of slower speed films (or slower shutter speeds) it is necessary to stop down the diaphragm less and this requires less current to the coil 16, the curves 82, 83 and 84 representing the desired characteristics of the circuit for the slower speeds, the curves 81, 82, 83 and 84 being parallel with one another. Selective manual adjustment of the resistance box, adjusts the circuit from the curve 81 to any of the curves 82, 83 and 84.

Adjustment of the circuit of FIG. 1 to shift the characteristic curve from the curve 81 to one of the curves 82, 83 and 84 is effected at low illumination of the cell 19 by providing a resistor in shunt with the load circuit which consists of the elements 16, 21, and 22, and also provide a resistor in series with the shunt resistor and load circuit. The shunting resistor (or conductance) is effective at low illumination because of the high internal shunt resistance (or conductance) of the cell 19 at low illumination, but, as the illumination is increased, the internal resistance of the cell decreases rapidly and the effectiveness of the external shunt resistance in damping the coil 16 lessens. To offset the decreasing effectiveness of the shunt resistor as the illumination of the cell increases and causes the internal shunt resistance of the cell to decrease, the series resistor in series with the external shunt resistor and the load circuit is provided. The series resistor is highly effective during high illumination when the internal shunt resistance of the cell 19 is low and becomes increasing less efficient as the internal shunt resistance of the cell increases with decrease of illumination. The combined effect of the external shunt resistor and the series resistor is to keep the damping of the coil 16 uniform throughout the range of illumination of the cell 19, and the individual resistances of the resistors of the resistance box 23 are of such values as to provide this result for each setting of the resistance box.

The resistance box 23 is designed to selectively connect shunt resistors 24, 25 and 26 across the cell 19 and to connect simultaneously different ones of series resistors 27, 28, and 29 between the cell and ground and thus in series with the cell on the one side and on the other side the corresponding resistor 24, 25 and 26, the galvanometer coil 16 and the compensating network of the thermistor 21 and resistor 22.

The resistance box comprises a printed circuit board 30 (FIGS. 2 and 3) secured to mounting bosses 31 of camera casing 32 by screws 33. Two rows of printed contacts 34, 35, 36, 37, 38 and 39 on the board 30 have leads from one end of the resistors 24 to 29 soldered thereto while the other ends of the shunt resistors 24, 25 and 26 are all soldered to a printed bus bar 40. The bus bar 40 is connected to the cell 19 and thermistor 21 (FIG. 1) and resistor 22 by a conductor 41. A dead printed contact 42 (FIGS. 2 and 3) is at the end of the row of contacts 34, 35 and 36, and a contact portion 43 of a bus bar 44 and the contacts 37, 38 and 39 are in the other row. One end of each series resistor 27, 28 and 29 are soldered to one of the contacts 37, 38 and 39 and the other ends are soldered to the bus bar 44.

A strip 50 of conductive metal has a detent and clearance slot 49 and detent grooves 51. The strip 50 is fixed to the board 30 by end tabs 52 and 53 crimped over shoulder 54 and bar portion 55 of the board. The board 30 has slots 56, 57 and 58 therein to provide clearance for the detent grooves 51, the slot 56 extending along the board to provide clearance for and guide a pin or rod 59 of a switch actuator 60. The pin 59 and manually operable actuator 60 are composed of molded electrical insulating material and are integral with one another. The actuator has a head portion slidable along the exterior of the casing and a rectangular guide bar portion 61 projecting into and slidable along guideway 62 in the casing. The free end of the pin 59 is reduced to receive a bowed leaf spring contactor 63, and a snap nut 64 holds the contactor 63 on the end of the pin 59 while in a flexed condition. The contactor 63 is bifurcated at one end to provide arms 65 and 66 having rounded contacting portions 67 and 68. The contacting portions are designed to selectively engage and bridge the dead contact 42 and the contact portion 43 and the pairs of laterally spaced contacts 34 and 37, 35 and 38, and 36 and 39 while a V-shaped detent contactor portion 69 of the contactor 63 engages successive ones of the grooves 51 each of which is complementary in cross-section to the detent contactor portion 69 as illustrated in FIG. 3. Thus, the actuator 60 may be moved along the casing to move the contactor 63 selectively into engagement with any of the pairs of contacts 42 and 43, 34 and 37, 35 and 38, and 36 and 39 and the contactor is held in that position by the detent portion 69 engaging the particular detent groove 51 corresponding to that pair of contacts. The contactor 63 bridges the pair of contacts it is engaged with and also connects them electrically to the strip 50 which is connected to the photocell by conductor 70 (FIG. 1).

The above automatic exposure control device may be set for four different film speeds. Assuming the film 11 to be the fastest film, the contactor 63 is set manually on the contacts 42 and 43 to bypass all the resistors of the resistance box 23. In this setting, for a given intensity of illumination on the photocell 19, the highest current flows through the galvanometer coil 16 and the diaphragm discs 13 and 14 are rotated to provide the lowest aperture for that illumination, the intersection of slots 73 and 74 determining the area of the aperture or path of light. Assuming the emulsion on the film 11 to be the next to the fastest emulsion, the user moves the contactor 63 into engagement with the contacts 34 and 37. This connects the resistor 24 in shunt with the galvanometer coil 16 and resistor 22 and thermistor 21, and the resistor 27 is connected thereby in series with these elements. The shunt resistor 24 has the effect of reducing the current through the galvanometer coil 16 mostly during conditions of low illumination of the photoelectric cell 19, and the series resistor 27 reduces the flow of current through the coil mostly during conditions of high illumination of the cell. The combined effect of the resistors 24 and 27 is to cause the circuit to shift from the fastest film speed characteristic 81 (FIG. 4) to the characteristic 82.

For the next lower film speed, the resistance box is adjusted to bridge the resistors 25 and 28 and connect them into the circuit in place of the resistors 24 and 27. The resistance of the shunt resistor 25 is less than that of the resistor 24 and that of the series resistor 28 is greater than that of the resistor 27, and the effect is to cause the circuit to have the operating characteristic 83 and the coil 16 to have less current for a given intensity of illumination of the cell 19. For the slowest film speed, the user of the camera moves the contactor 63 to its extreme right-hand position in which the resistors 26 and 29 are connected into the circuit. The resistance of the shunt resistor 26 is less than that of the resistor 25 and the resistance of the series resistor 29 is greater than that of resistor 28 by such amounts that the circuit now has the operating characteristic 84. For this setting of the resistance box 23, the circuit has the lowest current to the coil 16 for a given illumination of the cell 19 so that the discs 13 and 14 stop down the light path the least for that illumination. It should be noted that the characteristic curves 81 to 84 are parallel with each other so that merely the range of illumination of the cell is shifted for a change in setting of the resistance box.

The system described above has been found to operate with a high degree of efficiency. In a constructed embodiment of the invention, the following constants and structural details were used, and these are given merely by way of example and are not intended to limit the invention in any way:

| | |
|---|---|
| Combined load resistance of coil 16, thermistor 21 and resistor 22 | 6.3 kilohms. |
| Photoelectric cell 19 | Output from 16 microamperes at 1.25 candles per square foot to 50 microamperes at 30 candles per square foot. |
| Resistor 24 | 15 kilohms. |
| Resistor 25 | 5.6 kilohms. |
| Resistor 26 | 3.3 kilohms. |
| Resistor 27 | 470 ohms. |
| Resistor 28 | 820 ohms. |
| Resistor 29 | 1200 ohms. |

The above described camera may use films of four different speeds, and may be adjusted to provide correct exposure for each film merely by setting the button or slide 60 of the resistance box 23 to the adjustment designed for the film speed to be used, the slide and the camera being provided with indicia indicating the correct settings of the resistance box for the several film speeds.

The device shown in FIG. 5 forms an alternate embodiment of the invention, and is similar to the embodiment shown in FIGS. 1 to 4 but omits the resistance box 23, a series potentiometer 91 and a shunt potentiometer 92 being substituted for the resistance box. The potentiometer 92 is connected across the photocell 19 and potentiometer 91 in shunt with the resistor 21, thermistor 22, and meter or galvanometer coil 16. A mechanical connection 93 is provided to provide inverse adjustment of the potentiometers 91 and 92 and incremental damping of the coil 16. Thus, the characteristic curve may be shifted incrementally between the curves 81 and 84 and is always substantially parallel to the curves 81 and 84. Known switching means also may be provided, if desired, to selectively connect only the potentiometer 91 into the circuit, only the potentiometer 92 into the circuit, neither potentiometer in the circuit or both potentiometers into the circuit.

While the devices have been described above as for adapting the exposure control device to different film speeds, it is obvious that they are equally well suited to adapt the devices to different shutter speeds.

While the invention is thus described, it is not wished to be limited to the precise details described, as changes may be readily made without departing from the spirit of the invention.

What is claimed is:

1. In a photographic camera, adjustable exposure control means, a galvanometer for adjusting the exposure control means, a photoelectric cell responsive to light exterior of the camera and serially connected to the galvanometer for energizing the galvanometer, temperature-compensating resistance means in circuit with the galvanometer, second resistance means shunting the galvanometer, third resistance means serially connecting the photoelectric cell to the second resistance means and the galvanometer, and manually operable means for simultaneously varying the resistance of the second and third resistance means to shift the range of the galvanometer.

2. In a photographic camera, adjustable exposure control means, galvanometer means for adjusting the exposure control means, photoelectric cell means responsive to light exterior of the camera for energizing the galvanometer means, means including shunt resistance means of adjustable resistance connected across the galvanometer means, means including series resistance means of adjustable resistance connected to the photoelectric cell means at one end thereof and at the other end thereof to the galvanometer means and the shunt resistance means, and manually operable means for adjusting the shunt resistance means and the series resistance means to vary the respective resistances thereof generally inversely relative to one another.

3. In a photographic camera, adjustable exposure control means, a galvanometer for adjusting the exposure control means, a photoelectric cell responsive to light exterior of the camera for energizing the galvanometer, the cell having high internal resistance when subjected to low illumination and having low internal resistance when subjected to high illumination, temperature-compensating resistance means connected serially to the photoelectric cell and the galvanometer, a switch including a plurality of pairs of contacts and a single contact connected to one side of the galvanometer, the switch also having a contactor selectively movable to engae sequentially the single contact and each pair of contacts, a plurality of series resistors of decreasing resistances connected to said side of the galvanometer and one contact of each pair of contacts, and a plurality of shunt resistors of increasing resistances connetced to the other side of the galvanometer and the other contact of each pair of contacts, said resistances being arranged to be varied generally inversely relative to one another.

4. In a photographic camera, adjustable exposure control means, a galvanometer for adjusting the exposure control means, a photoelectric cell responsive to light exterior of the camera and serially connected to the galvanometer for energizing the galvanometer, first resistance means shunting the galvanometer, second resistance means serially connecting the photoelectric cell to the first resistance means and the galvanometer, and manually operable means for simultaneously varying the resistance of the first and second resistance means to shift the range of the galvanometer.

5. In a photographic camera, adjustable exposure control means, a galvanometer for adjusting the exposure control means, a photoelectric cell responsive to light exterior of the camera and serially connected to the galvanometer for energizing the galvanometer, the cell having a high internal resistance during low illumination and low internal resistance during high illumination, variable resistance means connected in series with the photoelectric cell to compensate for low internal resistance of the cell during high illumination thereof, variable resistance means connected in shunt with the galvanometer to compensate for high internal resistance during low illumination thereof, and manually operable means for adjusting each of the resistance means to vary the effective resistances thereof.

References Cited in the file of this patent

UNITED STATES PATENTS

| | | |
|---|---|---|
| 2,261,532 | Tonnies | Nov. 4, 1941 |
| 2,837,609 | Clayton et al. | June 3, 1958 |
| 2,838,985 | Burger et al. | June 17, 1958 |
| 2,841,064 | Bagby et al. | July 1, 1958 |
| 2,853,565 | Arthur et al. | Sept. 23, 1958 |